United States Patent Office 3,509,127
Patented Apr. 28, 1970

3,509,127
ISOLOGS OF LINCOMYCINS AND PROCESS
FOR PREPARING THE SAME
Fred Kagan, Kalamazoo, and Barney J. Magerlein, Portage, Mich., assignors to The Upjohn Company, Kalamazoo, Mich., a corporation of Delaware
No Drawing. Filed Apr. 30, 1968, Ser. No. 725,489
Int. Cl. C07c 47/18
U.S. Cl. 260—210
12 Claims

ABSTRACT OF THE DISCLOSURE

Novel antibacterial compounds of the formula:

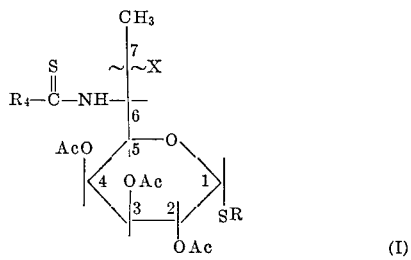

where Ac is hydrogen or a blocking group which is subsequently removed if desired, or an ester-or-ether-forming group, are prepared by replacing by sulfur, the carboxyl oxygen of a compound of the formula:

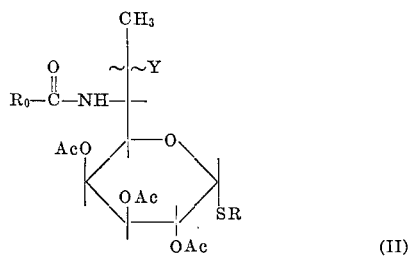

The replacement is effected advantageously by heating the starting compound of Formula II with phosphorous pentasulfide and if desired removing the blocking groups, X being OH or halogen and Y being OAc or halogen.

BRIEF SUMMARY OF THE INVENTION

This invention relates to novel compounds and to processes for preparing them, and is particularly directed to thioamido isologs of lincomycins and 7-halo-7-deoxylincomycins, as well as esters and ethers thereof, and to processes whereby they and like compounds are produced.

The novel compounds of the invention can be represented by the following structural formula:

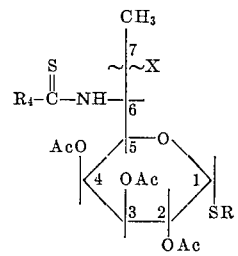

wherein X is hydroxyl, chlorine, bromine, or iodine; R is alkyl of not more than 20 carbon atoms; Ac is hydrogen or a blocking group; and

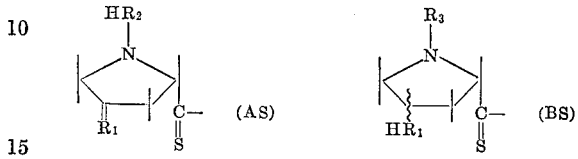

is a 4-substituted-L-2-pyrrolidinethiocarboxacyl of the formula:

$$\text{(AS)} \qquad \text{(BS)}$$

wherein $R_1$ and $R_2$ are alkylidene of not more than 20 carbon atoms (including methylene), advantageously not more than 8 carbon atoms, and aralkylidene of not more than 12 carbon atoms, advantageously not more than 8 carbon atoms; and $R_3$ is hydrogen or $HR_2$. Any or all of the 2-, 3-, 4-, and 7-hydroxy groups can be esterified or etherified.

Examples of alkyl of not more than 20 carbon atoms (R, $HR_1$, and $HR_2$) are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereto. Examples of cycloalkyl are cyclopropyl, cyclobutyl, cyclopentyl, cyclohexyl, cycloheptyl, cyclooctyl, 2 - methylcyclopentyl, 2,3 - dimethylcyclobutyl, 4-methylcyclobutyl, and 3-cyclopentylpropyl. Examples of aralkyl are benzyl, phenethyl, α-phenylpropyl, and α-naphthylmethyl. Examples of alkylidene, cycloalkylidene, and aralkylidene groups ($R_1$ and $R_2$) include methylene, ethylidene, propylidene, butylidene, pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and α-naphthylmethylene.

The novel compounds of the invention, Formula I, as well as other related compounds, can be prepared by replacing by sulfur, the carboxyl oxygen of a compound of the formula:

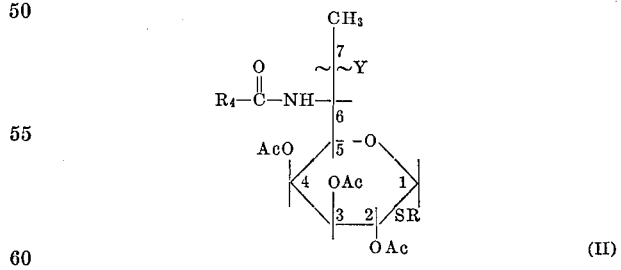

wherein Y is halogen or —OAc and Ac is a blocking group, advantageously a carboxylic acid acyl radical as exemplified hereinafter. The replacement is effected advantageously by mixing the starting compound of Formula II with phosphorous pentasulfide and heating.

The process has broader application and can be applied to starting compounds of Formula II wherein

can be any carboxylic acid acyl radical and R can be the radical of any mercaptan.

The HR₁— group can be in either the cis or trans position as illustrated in the following formulas:

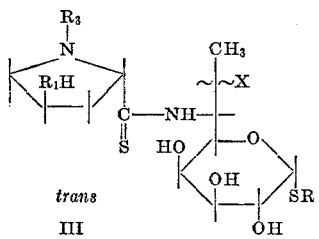

trans
III and

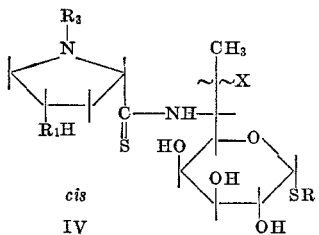

cis
IV

If desired, the cis and trans isomers can be separated by counter current distribution or chromatography, either before or after replacement of the carboxyl oxygen by sulfur.

When R₃ is hydrogen, it can be replaced by suitable alkylation or like procedure. Advantageously, this replacement is effected by reacting the compound according to Formula IBS (Compounds of Formula I wherein

is the acyl group of Formula BS) wherein R₃ is hydrogen with an oxo compound (an aldehyde or a ketone) and hydrogenating the resulting adduct with a catalyst effective to saturate an olefinic double bond. Either platinum or palladium can be used as the catalyst. Oxo compounds have the formula R₅R₆CO where R₅R₆C= is the same as R₂ given above.

Examples of suitable such oxo compounds are formaldehyde, acetaldehyde, propionaldehyde, butyraldehyde, acetone, isobutylmethyl ketone, benzaldehyde, phenlacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropylacetaldehyde, 2,2-dimethylcyclopropyl methyl ketone, cyclopentyl methyl ketone, cyclobutyl methyl ketone, cyclobutanone, cyclohexanone, 4-methylcyclohexanone, and the like.

BACKGROUND MATERIAL

The starting compounds of Formula II are prepared by N-acylating a compound of the formula:

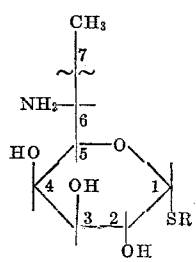

(V)

wherein Y is OH or halogen and R is as given above, with a 4-substituted-L-2-pyrrolidinecarboxylic acid of the formula:

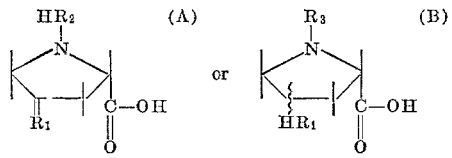

thereby forming a compound of the formula:

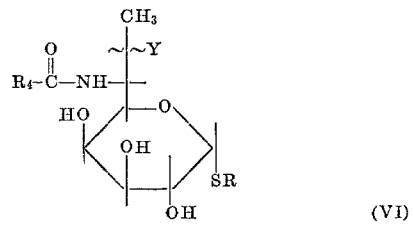

(VI)

and then covering the hydroxy groups with blocking groups, as for example, by o-acylation. Both the o-acylations and the N-acylations referred to herein can be effected by procedures already well known in the art for acylating amino sugars.

Starting compounds of Formula II wherein Y is halogen can be prepared by replacing by halogen, the 7-hydroxy of a starting compound of Formula II where Y and Ac are hydroxy. The replacement is effected advantageously by mixing the starting compound with Rydon reagent and heating. The replacement when Halo is chlorine can also be effected by mixing the starting compound with thionyl chloride and heating. The replacement when Halo is iodine is effected by a modified Rydon reagent process. Any or all of the 2-, 3-, and 4-hydroxy groups can be esterified or etherified before or after the halogenation. Any of the 2-, 3-, and 4-hydroxy groups not thus covered should be covered with a protective group before the thiation.

The starting acids of Formulas A and B can be prepared by the processes described in U.S. Patent 3,301,871.

The starting compounds of Formula II wherein

is as given above and wherein Y and AcO are hydroxy can also be prepared as described in U.S. Patent 3,380,992 from starting compounds Formula II wherein Y and AcO are hydroxy and

is a 4-substituted pyrrolidinecarboxylic acid of the formula:

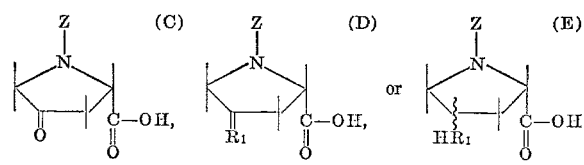

wherein Z is a protective group removable by solvolysis or hydrogenolysis, for example as described in U.S. Patent 3,380,992. Any and all of the compounds thus described in U.S. Patent 3,380,332 can be converted to the corresponding compound of Formula I by the processes of this invention and all such compounds are to be considered as disclosed herein the same as if they had been specifically named.

Starting compounds of Formulas V and VI where Y is chlorine or bromine can be prepared by mixing a compound of Formula V or VI where Y is OH with Rydon reagent and heating. The mechanism by which Rydon reagent effects the substitution of the 7-hydroxy by halogen is not fully understood. The mechanism is such that a change in configuration results. Thus, a 7(R)-hydroxy compound of the D-erythro configuration yields a 7(S)-halo compound of the L-threo configuration. In example 7(S) - chloro-7-deoxylincomycin which is derived from lincomycin (lincomycin has D-erythro configuration), has the L-threo configuration. Rydon reagents are formed by the addition of halogen to triphenylphosphine or triphenylphosphite or addition of an alkyl halide to triphenylphosphite and can be represented by the formula:

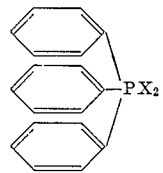

(VII)

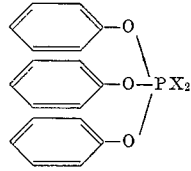

(VIII)

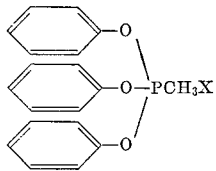

(IX)

wherein X is halogen, e.g., chlorine, bromine, and iodine. Rydon et al., J. Chem. Soc., 2224 (1943); Ibid, 2281 (1945); Ibid, 3043 (1956). The Rydon reagent can be formed in situ by addition of halogen or methyl halide to a solution of the triphenylphosphine or triphenylphosphite in an inert solvent such as acetonitrile or dimethylformamide, or it can be isolated as a separate entity. In either case the reaction with the lincomycin or related compound is effected by contacting the Rydon reagent therewith in an inert solvent, e.g., acetonitrile or dimethylformamide, untile the desired substitution of the 7-hydroxy is obtained. The reaction takes place at ordinary temperature, though gentle heating can be effected if desired. Advantageously the temperature is maintained between about 20° C. and about 55° C. The product can be recovered from the reaction mixture by well-known techniques such as filtration, solvent extraction, etc. The reaction mixture advantageously is treated with methanol to destroy any excess Rydon reagent, filtered to remove any solid such as triphenylphosphine oxide, formed in the reaction, and then treated to recover the product. The methanol can be added either before or after the filtration. Advantageously the treated and filtered reaction mixture is evaporated to dryness and purified by solvent extraction and/or chromatography.

Alternatively the substitution of the 7-hydroxy with chlorine can be effected by heating with thionyl chloride. The starting compound of Formula V or VI, advantageously in the form of an acid-addition salt, e.g., the hydrochloride, is mixed with thionyl chloride, advantageously in the presence of an inert solvent, with mild heating, advantageously at reflux temperature, until the desired substitution of the 7-hydroxy group by chlorine is effected. Advantageously, the reaction is carried out in an inert atmosphere, e.g., under nitrogen. Carbon tetrachloride can be used effectively as the solvent vehicle but other inert solvents such as chloroform, methylene chloride, ethylene chloride, ether, benzene, and the like can be used. A satisfactory procedure is to stir the reaction mixture at room temperature for a considerable period, say from about 1 to 18 hours or as long as necessary to obtain a resonably clear solution and then to raise the temperature to between about 50 and 100° C., for example, the reflux temperature (77° C. for carbon tetrachloride). After the reaction is complete, usually after heating at reflux for about 1 to 5 hours, the reaction mixture is allowed to cool, advantageously under nitrogen. Any material that separates on the cooling is collected and dried. The solvent is removed by vacuum distillation at a pot temperature advantageously less than about 35° C. and the material which precipitates is collected and dried and treated with ethanol to convert any residual sulfite intermediates to the desired product. The collected material can then be further purified by solvent extraction and/or recrystallization and can be recovered either as the free base or an acid addition salt.

The proportions of the reagents can be varied widely. Stoichiometrically, however, at least 3 moles of thionyl chloride is required for each mole of starting compound. Any larger amount can be used but ordinarily it is not necessary or desirable to use more than about a 10 fold excess. Advantageously, an excess of about 2 to 3 fold is used. The amount of solvent is not critical and can be varied widely in accordance with the practices in the art. Ordinarily from about 15 to about 30 volumes of solvent for each part of solid starting compound will suffice. The proportion of solvent to thionyl chloride, however, is important because of the solubility of the product in thionyl chloride. If the ratio of solvent to thionyl chloride (v./v.) is high, the desired product precipitates on cooling of the reaction mixture and the work up to the product is simplified. For example, with carbon tetrachloride a mixture of products precipitates directly on cooling the reaction mixture if the v./v. proportion of carbon tetrachloride to thionyl chloride is kept above about 10 to 1.

Substitution of the 7-hydroxy by iodine is effected by a modification of the Rydon reagent process. In this process, the desired halogen substitution is effected simply by mixing the starting compound of Formula V or VI with triphenylphosphine and carbon tetraiodide in an inert solvent. The reaction takes place at room temperature (25° C.) but gentle heating up to reflux temperature of 50 to 60° C. can be used.

Acetonitrile and nitromethane are illustrative solvents. The triphenylphosphine and carbon tetraiodide are optimally used in equimolar proportions and advantageously in a substantial molar excess of the starting compound. Optimally about 4 moles of triphenylphosphine and 4 moles of carbon tetraiodide are used for each mole of starting compound of Formula II or V. The process can also be used for effecting chlorination and bromination by substituting carbon tetrachloride or carbon tetrabromide for the carbon tetraiodide.

DETAILED DESCRIPTION

In carrying out the process of this invention a compound of Formula II in which any hydroxy group is first protected, for example by O-acylation in a known manner, is mixed with phosphorous pentasulfide ($P_4S_{10}$) and heated in an inert solvent. Dioxane is particularly suitable; other solvent ethers can be used in its stead. Pyridine can also be used but has the disadvantage of complicating the recovery from the reaction mixture. The reaction is promoted by gentle heating, for example at reflux in dioxane. Higher or lower temperatures, say from 25 to 150° C., can be used.

Any or all of the 2-, 3-, 4-, and 7-hydroxy groups can be esterified either in the starting compounds or in the final product, for example, with hydrocarbon carboxylic acids, advantageously of not more than 18 carbon atoms, or halo-, nitro-, hydroxy-, amino-, cyano-, thiocyano-, or alkoxy substituted hydrocarbon carboxylic acids, advantageously also of not more than 18 carbon atoms.

Examples of carboxylic acid acyl radicals are the acyl radicals of the following acids: (a) saturated or unsaturated, straight or branched chain aliphatic carboxylic acids, for example, acetic, propionic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclopentaneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano- and lower alkoxyhydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboylic acids are mono-, di-, and trichloracetic acid; α- and β-chloropropionic acid; α- and γ-bromobutyric acid; α- and β-iodovaleric acid; mevalonic acid; 2- and 4-chlorocyclohexancarboxylic acid; shikimic acid; 2-nitro-1-methylcyclobutanecarboxylic acid; 1,2,3,-4,5,6-hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4,5-dibromo-2-methylcyclohexanecarboxylic acid; 5,6-dibromo-2-methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1-bromo-3,5-dimethylcyclohexanecarboxylic acid; homogentisic acid, o-, m-, and p-chlorobenzoic acid; anisic acid; salicyclic acid; p-hydroxybenzoic acid; β-resorcyclic acid; gallic acid; veratric acid; trimethoxybenzoic acid; trimethoxycinnamic acid; 4,4′-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid and lactic acid. Examples of such alkoxyhydrocarbon carboxylic acids are ethoxyformic acid (ethyl hydrogen carbonate); butyloxyformic acid; pentyloxyformic acid; hexyloxyformic acid; dodecycloxyformic acid; hexadecyloxyformic acid, and the like. Any of these acids can be used as a blocking group. Ordinarily, however, acetyl will suffice for this purpose. These acyl functions can be removed by hydrolysis in a known manner.

Any or all of the 2-, 3-, 4-, and 7-hydroxy groups can also be etherified, for example, with alkyl, advantageously of not more than 20 carbon atoms; cycloalkyl advantageously of from 3 to not more than 12 carbon atoms; or ylidene (e.g., 3,4-O-ylidene) group for example alkylidene, advantageously of not more than 20 carbon atoms and aramethylidene and vinylogs thereof, advantageously of not more than 12 carbon atoms. Examples of alkylidene are given above and examples of aralkylidene are furfurylidene, 5-methylfurfuylidene, benzylidene, m-tolylidene, o-tolylidene, p-tolylidene, o-chlorobenzylidene, m-chlorobenzylidene, m-bromobenzylidene, p-bromobenzylidene, p-methoxybenzylidene, m-methoxybenzylidene, o-methoxybenzylidene, 3,4-dimethoxybenzylidene, salicyclidene, p-hydroxybenzylidene, 3,4,5-trimethoxybenzylidene, piperonylidene, o-nitrobenzylidene, p-chlorobenzylidene, m-nitrobenzylidene, p-nitrobenzylidene, β-naphthylidene, o-bromobenzylidene, 2,4-dichlorobenzylidene, 3-methoxy-4-hydroxybenzylidene, terephthylidine, 3,4 - dihydroxybenzylidene, and cinnamylidene.

The compounds of Formulas IAS, and IBS (Compounds of Formula I where

are the acyl group AS and BS) exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic salicylic, 3-phenylsalicyclic, 5-phenylsalicyclic, 3-methylglutaric, orthosulfobenzoic, cyclopentanepropionic, 1,2-cyclohexanedicarboxylic, 4 - cyclohexanecarboxylic, octadecenylsuccinic octenyl succinc, methanesulfonic, benzenesulfonic, helianthic Reinecke's, dimethyldithiocarbamic, cyclohexylsulfamic, hexadecylsulfamic, octadecylsulfamic, sorbic, monochloroacetic, undecylenic, 4′-hydroxyazobenzene-4-sulfonic, octyldecylsulfuric, picric, benzoic, cinnnamic, and like acids.

The acid-addition salts can be used for the same purposes as the free base or they can be employed to upgrade the same. For example, the free base can be converted to an insoluble salt, such as the picrate, which can be subjected to purification proceduers, for example, solvent extractions and washings, chromatography, fractional liquid-liquid extractions, and crystallization and then used to regenerate the free base form by treatment with alkali or to make a different salt by methathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by methathesis. The free bases of Formulas IAS and IBS can be used as a buffer or as an antacid. The compounds of Formulas IAS and IBS react with isocyanates to form urethanes and can be used to modify polyurethane resins. The long chain compounds, i.e., where $HR_2$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

Thiamidolincomycin and its close analogues, i.e., where —$R_1H$ is cis or trans alkyl of not more than 8 carbon atoms; $R_3$ is hydrogen, methyl or ethyl; R is alkyl of not more than 8 carbon atoms, have antibacterial properties similar to lincomycin and can be used for the same purposes as lincomycin. The other analogues and isomers also show antibacterial properties and can likewise be used to treat infections in animals due to Gram positive organisms.

The following examples are illustrative of the process and products of the present invention but are not to be construed as limiting. The parts and percentages are by weight and the solvent ratios are by volume unless otherwise specified.

EXAMPLE 1

Thiamido lincomycin [methyl 6,8-dideoxy 6-(trans-1-methyl-4-propyl-L-2 - pyrrolidinethiocarboxamido) - 1-thio-D-erythro-α-D-galactooctopyranoside]

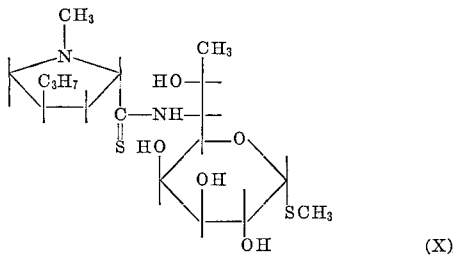

(X)

Part A–1.—Thioamidolincomycin tetraacetate

A mixture of 19.5 g. of lincomyin tetraacetate hydrochloride and 7.0 g. of phosphorus pentasulfide in 300 ml. of dioxane was heated at reflux for 5.5 hrs. during which time solution occurred. The dioxane was removed in vacuo. The brown residue was dissolved in 500 ml. of methylene chloride and extracted twice with 80 ml. portions of 1 N aqueous sodium hydroxide and once with water. The methylene chloride solution was filtered through sodium sulfate and the solvent distilled. The residue was dissolved in 20 ml. of acetone and 7 ml. of 4 N hydrochloric acid was added (acidic to indicator paper). With vigorous stirring 250 ml. of water was added. White crystals precipitated which were collected and dried. The yield was 24.6 g. Recrystallization from 8 ml. of acetone and 40 ml. of water afforded 9.0 g. of thiamidolincomycin tetraacetate hydrochloride, M.P. 207–214° C., with softening at 178° C.

A second crop of crystals, M.P. 221–225°, sinter at 198°, 900 mg., was deposited on standing. The analytical sample was dried at 80° C. under vacuum and protected from moisture while weighing.

*Analysis.*—Calc'd for $C_{26}H_{43}N_2O_9S_2Cl$ (percent): C, 49.79; H, 6.91; N, 4.47; S, 10.22; Cl, 5.65. Found (percent): C, 49.89; H, 6.85; N, 4.54; S, 10.72; Cl, 5.61.

Part B–1.—Thiamidolincomycin

To a solution of 5.0 g. of thioamidolincomycin tetraacetate in 50 ml. of methanol was added 50 ml. of 1 N aqueous sodium hydroxide over a 3 min. period. After 1 hr. 25 ml. of water was added and the mixture extracted four times with 75 ml. portions of methylene chloride. The combined extract was washed with water and dried. Evaporation of the solvent afforded 3.5 g. of residue. This solid was dissolved in 17 ml. of methanol, clarified by filtration through filter aid. Water (25 ml.) was added precipitating thioamidolincomycin a white solid which was collected and dried. It weighed 300 mg. and melted at 221–226° (sinter 210°). To the filtrate was added 35 ml. of acetone which precipitated 1.8 g. of partially crystalline solid with an indefinite M.P. This solid was stirred with 30 ml. of warm acetone and filtered. There was thus obtained an additional 530 mg. of product, M.P. 195–205° (sinter 150°).

About 600 mg. of crude thioamidolincomycin, M.P. >190° C., was chromatographed over silica gel using a solvent mixture of ethyl acetate:acetone:water (8:5:1) for elution. The yield of thioamidolincomycin, obtained as an oil which showed one spot by TLC (thin layer chromatography), was 325 mg.

*Analysis.*—Calc'd for $C_{18}H_{34}N_2O_5S_2$ (percent): C, 51.15; H, 8.11; N, 6.63; S, 15.18. Found (percent): C, 51.34; H, 8.37; N, 6.42; S, 15.15.

Antibacterial spectrum: Mcg./ml.[1]
  Staphylococcus aureus _____ 1.6–3.2
  Streptococcus hemolyticus _____ 1.6
  Streptococcus faecalis _____ 1.6
  Bacillus subtilis _____ 25
  Gram negative _____ >200

[1] Two-fold dilution endpoints in brain-heart infusion both at 20 hours.

The starting lincomycin tetraacetate hydrochloride was prepared as follows:

Part C–1.—Lincomycin tetraacetate hydrochloride

To a solution of 2.0 g. of lincomycin in 10 ml. of pyridine was added 3 ml. of acetic anhydride. The mixture was heated 6 hours on the steam bath, cooled to room temperature, stirred 1 hour with 1 ml. of water and evaporated to a thick syrup. The syrup was dissolved in 10 ml. of ethyl acetate, and the solution was washed with 10 ml. of ice-cold 5% sodium bicarbonate solution, then 3 times with 1 vol. portions of water, dried over anhydrous sodium sulfate, and evaporated on a rotary evaporator to dryness. The residue was dried overnight in a vacuum desiccator, dissolved in 75 ml. of anhydrous ether and treated with dry hydrogen chloride while cooling in ice until no further granular precipitate formed. The precipitate was immediately filtered, washed 3 times with 50 ml. portions of dry ether and dried in vacuo. It was dissolved in 30 ml. of chloroform and the solution was evaporated to 8 ml. on a steam bath. The addition of about 50 ml. of ether to the warm solution resulted in the crystallization of lincomycin tetraacetate hydrochloride having a melting point of 226–233° C.; an optical rotation $[\alpha]_D^{25} = +149°$ (c., 1 in $H_2O$); and the following elemental analysis:

*Analysis.*—Calc'd for $C_{26}H_{42}N_2O_{10}S \cdot HCl \cdot 1/2 H_2O$ (percent:) C, 50.35; H, 7.15; N, 4.52; O, 27.09; S, 5.17; Cl. 5.72; Eq. wt., 620; $H_2O$, 1.45; acetyl 27.8. Found (percent): C, 49.83; H, 7.57; N, 4.52; O, 27.10; S, 4.99; Cl. 5.81; Eq. wt., 605; $H_2O$, 1.72; acetyl 25.53.

EXAMPLE 2

7(S) - chloro - 7 - deoxythiamidolincomycin [methyl 7-chloro-6,7,8-trideoxy-6-(trans-1-methyl-4 - propyl - L - 2-pyrrolidinethiocarboxamido)-1-thio-L-threo-α-D - galactooctopyranoside]

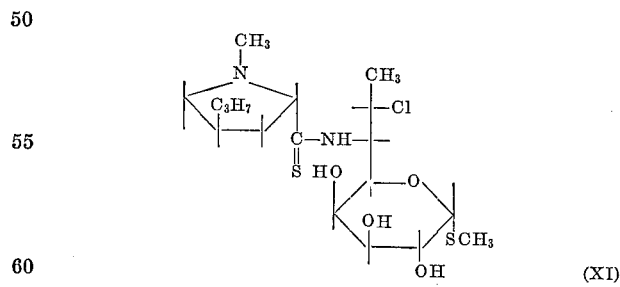

(XI)

Part A–2.—7(S)-chloro-7-deoxy-thiamidolincomycin triacetate

Four grams of 7(S)-chloro-7-deoxylincomycin triacetate was mixed with 100 ml. of benzene and 25 ml. of the solvent distilled. The mixture was clarified by filtration, removing a small cloudy precipitate. The benzene was removed by distillation. The residue was dissolved in 100 ml. of dioxane and 4 g. of phosphorus pentasulfide added. The mixture was heated to reflux for 1.5 hrs. An additional 4 g. of phosphorus pentasulfide was added followed by a third addition of 4 g. of phosphorus pentasulfide after 4 hrs. longer reflux. The mixture was finally refluxed for 2 hrs. more and then the solvent distilled in vacuo. The residue was dissolved in methylene dichloride and washed twice with dilute sodium hydroxide solution. The organic phase was dried and the solvent distilled. The residue of 8.6 g. was chromatographed over 500 g. of silica gel using cyclohexane:acetone (2:1) for elution. A fraction of 880 mg. was obtained which contained 7(S)-chloro-7-deoxythiamidolincomycin triacetate as well as other materials. This material was rechromatographed over 100 g. of silica gel using chloroform: methanol (40:1) for elution. A fraction of 320 mg. was obtained which after crystallization from methanol melted at 178–181° C. The yield was 120 mg. 7(S)-chloro-7-deoxy-thiamidolincomycin triacetate.

Analytical data was obtained for a sample prepared a above which melted at 179–180° C.

*Analysis.*—Calc'd for $C_{24}H_{39}ClN_2O_7S_2$ (percent): C, 50.82; H, 6.93; N, 4.94; S, 11.31. Found (percent): C, 50.75; H, 7.08; N, 4.88; S, 11.55.

Part B–2.—7(S)-chloro-7-deoxythioamidolincomycin

7(S) - chloro - 7 - deoxythiamidolincomycin triacetate, (12.9 mg.) was dissolved in 25 drops of acetone and 2 drops of 1 N aqueous sodium hydroxide added. After 10 min. at 26° TLC (chloroform: methanol, 6:1) showed 2 new slower moving spots. Two additional drops of alkali were added and after 10 min. only one spot was noted indicating complete hydrolysis. The solution was neutralized with N- hydrochloric acid and lyophilized.

Antibacterial spectrum: Mcg./ml.[1]
- Staphylococcus aureus ------------------ 0.4–0.8
- Streptococcus hemolyticus -------------- 0.2–0.8
- Streptococcus faecalis ----------------- 0.2–0.8
- Bacillus subtilis ---------------------- 6.4–12.5
- Gram negative ------------------------- >200

[1] Two-fold dilution endpoints in brain-heart infusion broth at 20 hours.

The starting 7(S)-chloro-7-deoxylincomycin triacetate was prepared as follows:

Part C–2.—7(S)-chloro-7-deoxylincomycin hydrochloride

A solution of 50 g. of lincomycin hydrochloride, 120 g. of triphenylphosphine, and 500 ml. of acetonitrile in a 3 liter flask equipped with a stirrer was cooled in an ice bath and 500 ml. of carbon tetrachloride was added in one portion. The reaction mixture was then stirred for 18 hrs. without addition of ice to the cooling bath. The reaction was evaporated to dryness under vacuum on a 50–60° C. water bath, yielding a clear, pale yellow viscous oil. An equal volume of water was added and the mixture shaken until all of the oil was dissolved. The resulting suspension of white solid ($\phi_3PO$) was filtered through a sintered glass mat and discarded. The filtrate was adjusted to pH 11 by addition of 6 N aqueous sodium hydroxide. A solid precipitate. The resulting slurry was extracted with four 300 ml. portions of chloroform. The aqueous phase was discarded. The combined chloroform extract was washed once with 100 ml. of saturated aqueous sodium chloride solution and the sodium chloride phase was discarded. The chloroform phase was evaporate to dryness under vacuum on a 50–60° C. water bath and an equal volume of methanol was added to the residue and the resulting solution heated at reflux for 1 hr. The methanol solution was evaporated to dryness under vacuum on a 50–60° C. water bath. The residue was a clear, pale yellow viscous oil. An equal volume of water and 10 ml. of 37% aqueous HCl was added and the resultant was shaken until the oil dissolved and a white solid (more $\phi_3PO$) remained in suspension. The suspension was filtered through a sintered glass mat at pH 1–2 and the solid discarded. The filtrate was extracted twice with 100 ml. of carbon tetrachloride. The carbon tetrachloride phase was discarded. The aqueous phase was adjusted to pH 11 by addition of 6 N aq. sodium hydroxide and extracted four times with 300 ml. portions of chloroform. The combined chloroform extract was washed three times with 100 ml. of saturated aq. sodium chloride solution and the sodium chloride phase was discarded. The chloroform extract was dried over anhydrous magnesium sulfate, filtered and the filtrate evaporated to dryness under vacuum on a 50–60° C. water bath. The residue was a clear, colorless glass weighing 45 g. analyzing about 95% 7(S)-chloro-7-deoxy-lincomycin. To the crude product there was added 100 ml. of ethanol with warming until a clear solution was obtained. The 150 ml. ethyl acetate was added and the resultant filtered through a glass mat and the filtrate adjusted to pH 1 by the addition of saturated ethanolic·HCl. Crystallization soon occurred. The resultant was allowed to stand at 0° C. for 18 hrs. and then filtered through a sintered glass mat. The solid was dried under vacuum at 60° C. for 18 hr. yielding 35 g. (67% yield) of 7(S)-chloro-7-deoxylincomycin hydrochloride as an ethanol solvate. On recrystallization from aqueous acetone (7 ml. $H_2O$ to 300 ml. acetone) there was obtained an analytical sample having the following analysis:

*Analysis.*—Calc'd for $C_{18}H_{33}ClN_2O_5S·HCl·H_2O$ (percent): C, 45.18; H, 7.37; S, 6.70; $H_2O$, 3.77. Found (percent): C, 45.09; H, 7.74; S, 6.45; $H_2O$, 4.24. $[\alpha]_D^{H_2O}$ +145.

Part D–2.—7(S)-chloro-7-deoxylincomycin triacetate 25 g. of 7(S)-chloro-7-deoxylincomycin hydrochloride was dissolved with warming in 125 ml. of pyridine and 125 ml. of acetic anhydride. After 17 hrs. at ambient temperature water was added while cooling until further exothermic effect was noted. The solution was concentrated under vacuum. The residue was dissolved in 250 ml. of water and 20% aqueous sodium hydroxide added with cooling and stirring until the solution gave an alkaline reaction to test paper. The solid was collected by filtration, washed with water and dried at 50° C. under vacuum. The yield was 28 g. of 7(S)-chloro-7-deoxylincomycin triacetate. On heating in a melting point bath it liquified at 116–120° C.

By substituting lincomycin in Examples 1 and 2 by other alkyl, cycloalkyl, or aralkyl 6,8-dideoxy-6-(trans-1-methyl-4-propyl - L - 2 - pyrrolidinecarboxamido)-1-thio-D-erythro-α-D-galacto-octopyranosides where alkyl, for example, is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl, for example, is cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; and aralkyl, for example, is benzyl, phenethyl, 3-phenylpropyl, and 1-naphthylmethyl, the corresponding alkyl, cycloalkyl, and aralkyl 6-acylamino- and 6-thioacylamino-6,8-dideoxy-1-thio-D-erythro - α - D - galacto-octopyranosides are obtained. For example, by substituting the lincomycin by ethyl, propyl, butyl, pentyl, and hexyl 6,8-dideoxy-6-acylamino- and 6-thioacylamino-1-thio-D-erythro-α-D-galacto-octopyranosides, the ethyl, propyl, butyl, pentyl, and hexyl 6-acylamino- and 6-thioacylamino-6,8-dideoxy-1-thio-D-erythro - α - D - galacto-octopyranosides and the corresponding acylamino- and 6-thioacylamino - 7 - halo - 6,7,8 - trideoxy-1-thio-L-threo-α-D-galacto-octopyranosides, are obtained.

The acylamino and thioacylamino groups can be 4-substituted-L-2-pyrrolidinecarboxamido and 4-substituted-L-2-pyrrolidinethiocarboxamido of the formula:

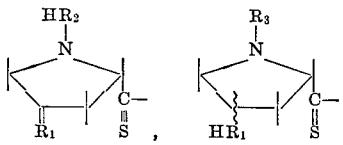

or

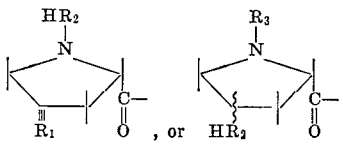

where $R_1$, $R_2$, and $R_3$ are as given above. Advantageously $R_1$ and $R_2$ can be methylene, ethylene, propylene, butylene, pentylene, or hexylene, and $R_3$ can be hydrogen or $HR_2$ in any combinations.

By substituting the lincomycins in the foregoing by 7-epilincomycins, the like compounds in the opposite configuration at the 7-position are obtained.

We claim:
1. A compound of the formula:

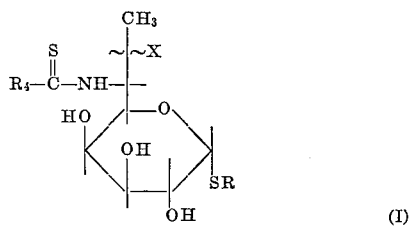

and its acid-addition salts wherein X is hydroxy, chlorine, bromine, or iodine; R is alkyl of not more than 20 carbon atoms, cycloalkyl of from 3 to not more than 8 carbon atoms, or aralkyl of not more than 12 carbon atoms;

is a 4-substituted-L-2-pyrrolidinethiocarboxacyl group of the formula:

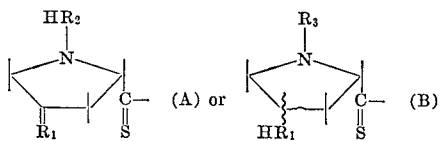

wherein $R_1$ and $R_2$ are alkylidene of not more than 20 carbon atoms, cycloalkylidene of from 3 to not more than 8 carbon atoms, or aralkylidene of not more than 12 carbon atoms; and $R_3$ is hydrogen or $HR_2$; and the esters and ethers thereof, said esters being derived from a hydrocarbon carboxylic acid of not more than 18 carbon atoms or the halo, nitro, hydroxy, amino, cyano, thiocyano or alkoxy substituted derivatives thereof.

2. A compound according to claim 1 in which the

group has the formula:

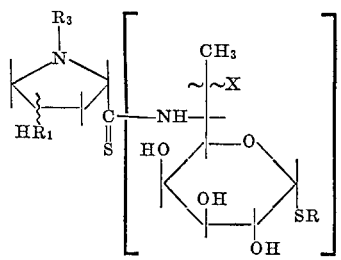

wherein $HR_1$ and R are lower alkyl and $R_3$ is hydrogen or lower alkyl.

3. A compound according to claim 2 wherein X is hydroxy.

4. A compound according to claim 2 wherein X is halogen.

5. A compound according to claim 2 wherein X is chlorine, R is methyl or ethyl, $HR_1$ is pentyl, and $R_3$ is hydrogen, methyl, or ethyl.

6. A compound of the formula:

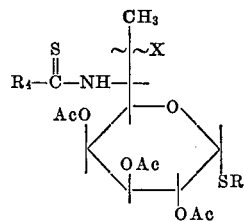

and its acid addition salts wherein X is AcO—, chlorine, bromine, or iodine; R is alkyl of not more than 20 carbon atoms, cycloalkyl of from 3 to not more than 8 carbon atoms, or aralkyl of not more than 12 carbon atoms; Ac is hydrocarbon carboxacyl of not more than 18 carbon atoms or halo, nitro, hydroxy, amino, cyano, thiocyano, or alkoxy substituted hydrocarbon carboxacyl of not more than 18 carbon atoms, and

is a 4-substituted-L-2-pyrrolidinethiocarboxacyl group of the formula:

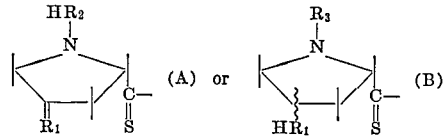

wherein $R_1$ and $R_2$ are alkylidene of not more than 20 carbon atoms, cycloalkylidene of from 3 to not more than 8 carbon atoms, or aralkylidene of not more than 12 carbon atoms; and $R_3$ is hydrogen or $HR_2$.

7. A compound according to claim 6 in which the

group has the formula:

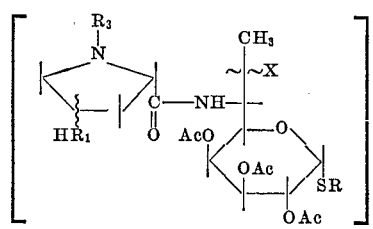

wherein $HR_1$ and R are lower alkyl and $R_3$ is hydrogen or lower alkyl.

8. A compound according to claim 7 wherein X is AcO, R is methyl or ethyl, $HR_1$ is alkyl of not more than eight carbon atoms, and $R_3$ is hydrogen, methyl, or ethyl.

9. A compound according to claim 7 wherein X is halogen, R is methyl or ethyl, $HR_1$ is propyl, and $R_3$ is hydrogen, methyl, or ethyl.

10. A compound according to claim 7 wherein X is chlorine, R is methyl or ethyl, HR$_1$ is pentyl, and R$_3$ is hydrogen, methyl, or ethyl.

11. Thiamidolincomycin.

12. 7(S)-chloro-7-deoxythioamidolincomycin.

References Cited

UNITED STATES PATENTS 3,366,624  1/1968  Argoudelis et al. _____ 260—210
3,380,992  4/1968  Argoudelis et al. _____ 260—210
3,116,282  12/1963  Hunter _____ 260—211.5

LEWIS GOTTS, Primary Examiner

JOHNNIE R. BROWN, Assistant Examiner

U.S. Cl. X.R.

260—999

UNITED STATES PATENT OFFICE
CERTIFICATE OF CORRECTION

Patent No. 3,509,127     Dated April 28, 1970

Inventor(s) Fred Kagan and Barney J. Magerlein

It is certified that error appears in the above-identified patent and that said Letters Patent are hereby corrected as shown below:

Column 4, line 65, "3,380,332" should read --3,380,992--. Column 5, line 38, "(1943)" should read --(1953)--; line 39, "(1945)" should read --(1954)--; line 47, "untile" should read --until--. Column 6, line 3, "resonably" should read --reasonably--. Column 8, lines 6 and 7, "salicyclidene" should read --salicylidene--. Column 9, line 75, "325 mg." should read --425 mg.---. Column 10, line 10, "both" should read --broth--. Column 11, line 15, "a above" should read --as above--.

Signed and sealed this 14th day of September 1971.

(SEAL)
Attest:

EDWARD M. FLETCHER, JR.
Attesting Officer

ROBERT GOTTSCHALK
Acting Commissioner of Patents